No. 737,663. PATENTED SEPT. 1, 1903.
W. H. ROBBINS.
HAY STACKER.
APPLICATION FILED JAN. 28, 1903.
NO MODEL. 2 SHEETS—SHEET 1.
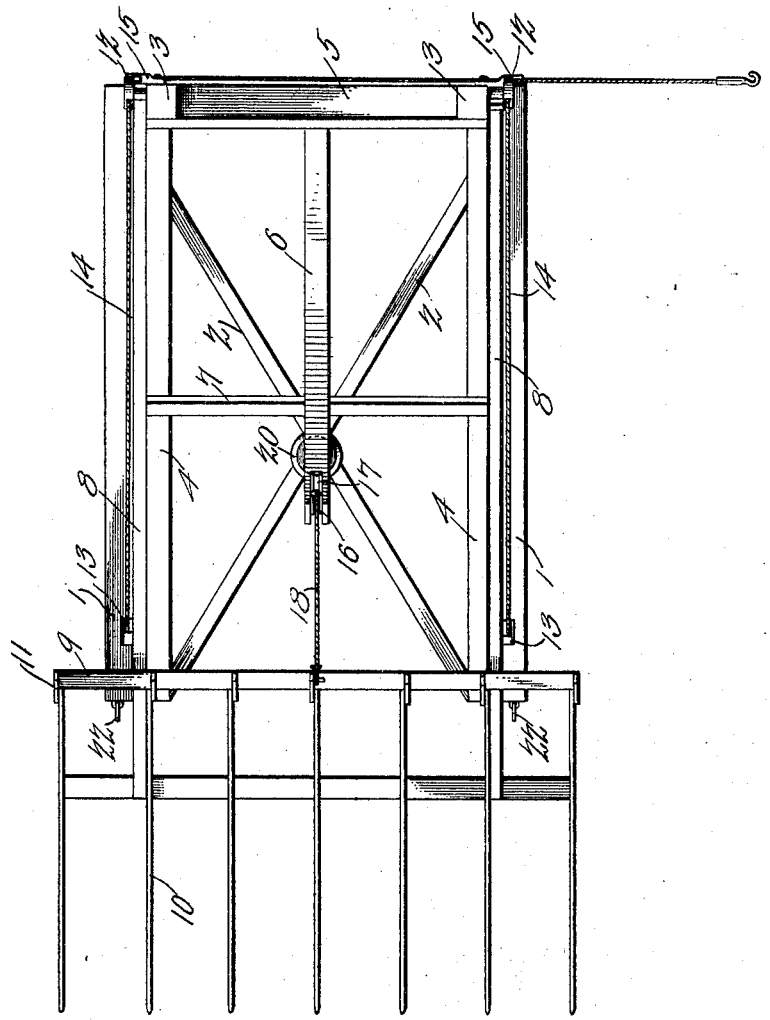

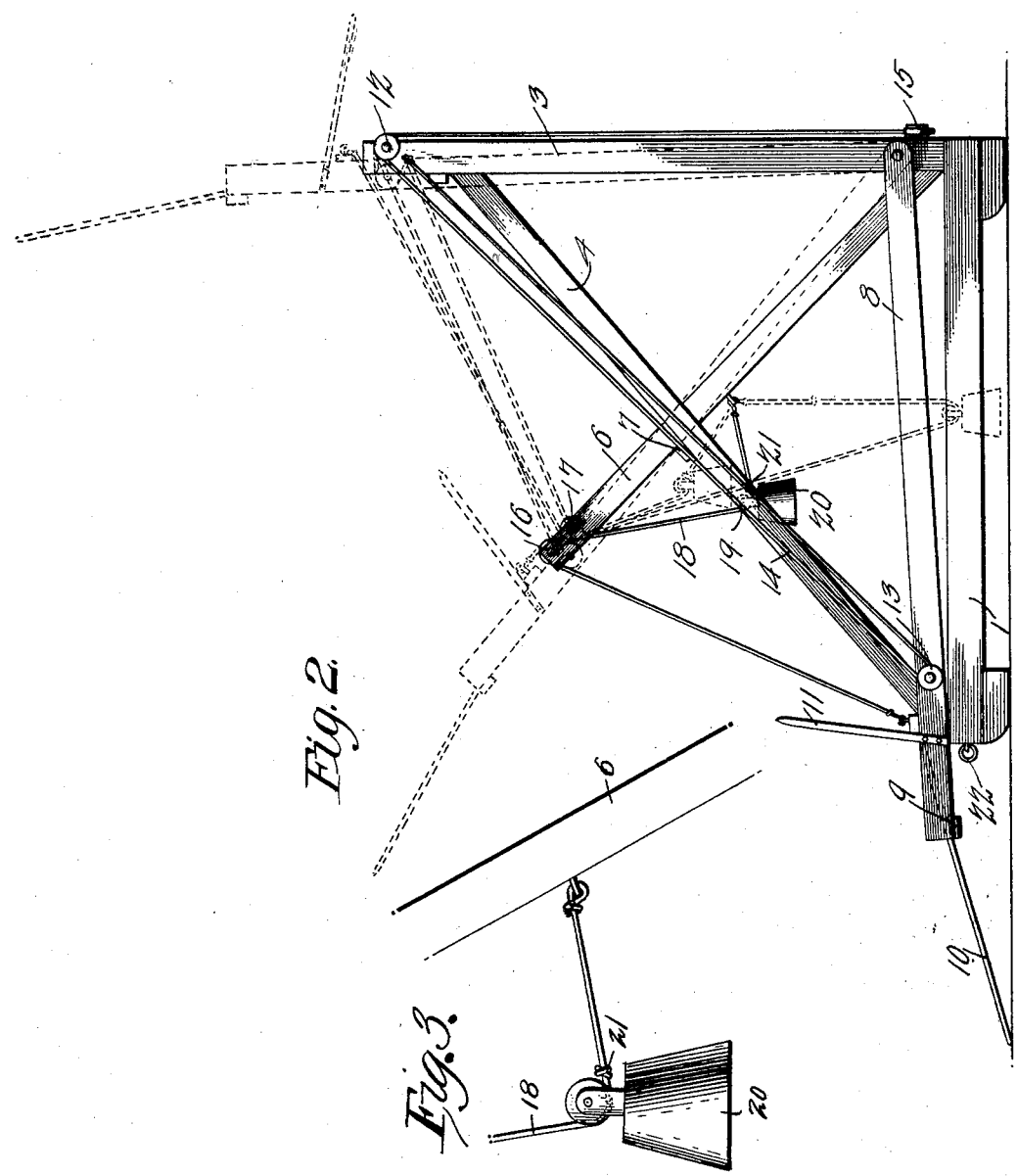

No. 737,663. Patented September 1, 1903.

UNITED STATES PATENT OFFICE.

WILLIAM HALSY ROBBINS, OF GREUB, WYOMING.

HAY-STACKER.

SPECIFICATION forming part of Letters Patent No. 737,663, dated September 1, 1903.

Application filed January 28, 1903. Serial No. 140,921. (No model.)

*To all whom it may concern:*

Be it known that I, WILLIAM HALSY ROBBINS, a citizen of the United States, residing at Greub, in the county of Johnson and State of Wyoming, have invented a new and useful Hay-Stacker, of which the following is a specification.

My invention relates to improvements on Patent No. 222,583, of December 16, 1879; and it consists in an improved mode of supporting the counterweight which is used to assist in starting the fork-load of hay upward and in returning the empty fork to position to be loaded, together with certain other improvements that will appear in the following description and the accompanying drawings.

In the drawings, Figure 1 is a plan view, and Fig. 2 is a view in side elevation in which the fork is shown in full lines as in position to receive a charge of hay and in dotted lines at a point about midway of its course upward and in discharging position at the end of its upward course. Fig. 3 is a detail view showing the counterweight, the supporting-cord, and the knot for limiting the downward movement of the weight along said cord.

In all the figures above mentioned corresponding parts are indicated by the same characters of reference throughout.

My improved hay-stacker consists, generally speaking, in a frame provided with pulleys over which hoisting-cords run, a fork-carrier pivoted at one end to the frame and having rigidly secured to the other end a fork of suitable size, and a counterweight carried by a rope secured at one end to the fork and at the other to one of the frame members, the counterweight being supported on the rope by means of a pulley attached to the counterweight and having its movement on the rope limited in one direction by a knot.

Referring to the drawings, 1 1 represent the side members forming part of the base portion of the frame.

2 2 are diagonal braces which, together with the side members 1 1, form the base portion of the frame. The frame may be supported upon shoes or runners, as shown in the drawings, or, if preferred, may be mounted on wheels to make the stacker easy to transport from one locality to another.

3 3 are uprights secured to the side members 1 1 at one end thereof, and 4 4 are braces extending from the end of the frame, opposite that at which the uprights are secured, to the tops of the uprights.

5 5 are cross-pieces connecting the uprights 3 3.

6 is an arm secured at one end to the lower cross-piece 5 and extending toward the front of the machine at an angle of about forty-five degrees to the base of the frame, in which position it is maintained by a cross-piece 7, connecting the two braces 4 4, upon which the arm 6 is secured.

8 8 are the two side members of a carrier-frame, pivoted to the uprights 3 3 near their lower ends and having at the free end thereof a fork 9, which is rigidly secured thereto. The fork 9 consists of the fingers 10 10 10, &c., upon which the load of hay is to be placed when the fork is lowered, and the fingers 11 11 11, &c., which serve to prevent the load from sliding off the fork as it is swung upward.

In the upper portion of the braces 3 3 I provide pulleys 12 12, and on the pivoted frame members 8 8, near the fork, I provide similar pulleys 13 13, over which the hoisting-ropes 14 14 pass. The hoisting-ropes are secured at one end to the uprights 3 3 just above the juncture of the braces 4 4 with the uprights and are then brought down under the pulleys on the pivoted frame members 8 8, thence over the pulleys 12 12, and, finally, downward and under pulleys 15 15, secured to the uprights 3 3 near their lower ends, being passed out upon either side of the machine, as desired.

At the upper end of the oblique arm 6 I provide two pulleys 16 and 17 in the same vertical plane with their grooved peripheries and so close together that a rope passing between them just escapes contact with one while resting upon the other. A rope 18, secured at one end to one of the cross-bars of the fork, is passed upward over the pulley 16, downward between 16 and 17, and fastened at its other end to the oblique arm 6. Supported upon the rope 18 by means of a pulley 19, which travels thereon, is a counterweight 20, the action of which will be hereinafter explained. The upward movement of the counterweight is limited only by the pulleys 16 and 17; but its downward movement along the rope 18 is limited by a knot 21, whose position is determined by the dimensions of the frame members and the carrier-arms 8 8.

To facilitate the shifting of the stacker from side to side, I provide near the forward end of each of the side members 1 1 of the base portion of the frame a draft-ring 22, to which a team may be harnessed.

In using my improved stacker the fork, which is heavy enough to raise the counterweight as it descends, is lowered until it rests upon the ground. It is then loaded with hay and drawn upward by a pull upon the ropes 14 14, the necessary power being usually furnished by a team harnessed thereto. In hoisting the carrier-frame upward with its load of hay the team walks straight out from the pulleys 15 15 to either side of the stacker, it being understood that if it is desired to have the direction of pull to the right of the machine the ropes 14 14 must pass down on the left side of the pulleys 15 15, and vice versa. When the fork reaches the top of its upward path, the frame members 8 8 are in vertical position and the load slides off the fingers 11 11 onto the stack. The team being now brought back toward the machine, the carrier-frame and fork are automatically lowered by the action of the counterweight 20, which rests against the knot 21 and pulls straight downward from the pulley 17. This downward pull of the counterweight causes the fork to travel from the top of its swing until the side members 8 8 are substantially parallel with the oblique arm 6. When the fork has reached this position, its own weight, together with that of the pivoted frame to which it is secured, is sufficient to overcome the pull of the counterweight, which now tends to oppose its downward movement. Consequently the fork continues to move downward until it reaches the ground; but its movement is checked during the latter portion of its descent by the action of the counterweight, and the fork and carrier-frame do not strike the ground with sufficient force to cause any damage.

The principal difference between the stacker disclosed in the foregoing description and that in Patent No. 222,583, upon which my invention is an improvement, is in supporting the counterweight 20 by means of a pulley which travels upon the rope 18 and limiting its movement in one direction from this rope by means of the knot 21. The advantages obtained by this construction are that the counterweight is always operative during every portion of the movement of the carrier-frame and fork and is never, as in the Patent No. 222,583, inoperative during a portion of the travel of the carrier-frame and fork, because the counterweight rests upon the ground. By having the counterweight continuously operative the movement of the carrier-frame and fork is made smoother and more nearly uniform than in the former patent, and the possibility of any tangling of the rope carrying the counterweight, as a result of the rope having become slack during the period when the counterweight rests upon the ground, is completely avoided.

Having now fully described the construction and operation of my improved stacker and pointed out the advantages thereof, what I claim as new, and desire to secure by Letters Patent, is—

The combination of a supporting-frame, a carrier-frame pivoted at one end to the supporting-frame and having a fork secured to its free end, hoisting devices for the carrier-frame, a cord fastened at one end to the fork and at the other end to the supporting-frame, a pair of pulleys carried by the supporting-frame and lying in the same plane between which the cord passes, a counterweight suspended from said cord by means of a pulley, and means for limiting the movement of the pulley along the cord, substantially as described.

In testimony that I claim the foregoing as my own I have hereto affixed my signature in the presence of two witnesses.

WILLIAM HALSY ROBBINS.

Witnesses:
ALVIN BENNETT,
ALVIN T. CLARK.